United States Patent [19]
Shinoda et al.

[11] Patent Number: 5,303,216
[45] Date of Patent: Apr. 12, 1994

[54] OPTICAL RECORDING AND REPRODUCING APPARATUS FOR TRACKING WOBBLING GUIDE GROOVES

[75] Inventors: Masahisa Shinoda; Kenjiro Kime; Toshiya Matozaki; Keiji Nakamura; Toru Yoshihara; Takeshi Ito, all of Nagaokakyo, Japan

[73] Assignee: Mitsubishi Denki Kabushiki Kaisha, Tokyo, Japan

[21] Appl. No.: 935,925

[22] Filed: Aug. 27, 1992

[30] Foreign Application Priority Data

Aug. 28, 1991 [JP] Japan .................................. 3-217027
Nov. 22, 1991 [JP] Japan .................................. 3-307418

[51] Int. Cl.$^5$ .............................................. G11B 7/09
[52] U.S. Cl. ................. 369/44.13; 369/44.36; 369/44.37
[58] Field of Search ............. 369/44.13, 44.25–44.26, 369/44.34–44.36, 44.41, 44.37

[56] References Cited

U.S. PATENT DOCUMENTS

| | | | |
|---|---|---|---|
| 3,963,862 | 6/1976 | Bouwhuis | 369/44.13 X |
| 4,223,347 | 9/1980 | Bouwhuis et al. | 369/44.13 X |
| 4,775,968 | 10/1988 | Ohsato | . |
| 4,815,064 | 3/1989 | Melbye | 369/44.13 X |
| 4,935,913 | 6/1990 | Shinoda | 369/54 |
| 5,138,592 | 8/1992 | Fujita | 369/44.13 |
| 5,247,507 | 9/1993 | Morimoto, et al. | 369/44.26X |

FOREIGN PATENT DOCUMENTS

| | | |
|---|---|---|
| 32271 | 7/1981 | EPO |
| 324949 | 7/1989 | EPO |
| 426879 | 5/1991 | EPO |
| 53-13123 | 5/1978 | Japan . |
| 61-94246 | 5/1986 | Japan . |
| 2-53853 | 11/1990 | Japan . |
| WO91/01551 | 2/1991 | PCT Int'l Appl. . |

OTHER PUBLICATIONS

"Principles of Optical Disc Systems", pp. 70–75, G. Bouwhuis et al., (1985).
"Write-once Type CD Recorder with Swing Head", Masafumi Naitoh et al., vol. 44, No. 10, pp. 1403–1409, (1990).
"A new tracking servo method: Differential Push-Pull method", Ohsato, pp. 127–132, Dec. 17–19, 1986.
"MO Disk Recorder for Industrial Applications", Yokota et al., pp. 166–169, Oct. 15–17, 1990. Patent Abstracts of Japan, Vol. 13, No. 460, (P-946), 10/18/1989 & JPOI-179232.

Primary Examiner—W. R. Young

[57] ABSTRACT

An optical recording and reproducing apparatus uses a laser to form one or more spots on an information recording medium preformatted with wobbling guide grooves, and detects tracking error. If the differential push-pull method of detecting tracking error is used, a center spot is flanked by satellite spots distant by an odd multiple of half the repeating period of the wobble. If the three-beam method is used, the distance is an odd multiple of one-fourth the repeating period of the wobble. If the push-pull method is used, a split photodetector generates a pair of electrical signals. The sum and difference of these signals are filtered, then synchronously detected, and the result is combined with the difference signal to generate a corrected tracking error signal.

22 Claims, 13 Drawing Sheets

OPTICAL RECORDING AND REPRODUCING APPARATUS FOR TRACKING WOBBLING GUIDE GROOVES

BACKGROUND OF THE INVENTION

This invention relates to optical recording and reproducing apparatus employing media preformatted with wobbling guide grooves, more particularly to the detection of tracking error in such apparatus.

Optical reproducing apparatus is already widely manufactured and sold in the form of compact disc players, and apparatuses are now becoming available that can both reproduce and record information, using write-once-read-many media or overwritable media. In both types of apparatuses information is read from (or written on) spiral or concentric tracks by means of a laser beam. The beam is kept on-track by a system that detects tracking error, and a servo system that corrects the detected tracking error.

A variety of methods are used to detect tracking error. In the well-known push-pull method, the laser beam is reflected from the medium to a split photodetector. Signals from the two halves of the detector are added to obtain the reproduced information signal, and mutually subtracted to obtain a tracking error signal.

In another method known as the three-beam, triple-beam, tri-beam, or twin-spot method, three laser beams are focused onto the medium, creating three spots that are aligned at an angle to the tracks. The center spot is used for reading or writing information. The other two spots, referred to as satellite spots, are reflected to two separate photodetectors, and the difference between the photodetector output signals is used as the tracking error signal.

Still another method, known as the differential push-pull method, also employs three spots, but reflects each spot to a split photodetector that generates a difference signal. The tracking error signal is obtained by adding the two difference signals from the satellite spots and subtracting the difference signal from the center spot.

These three methods were originally developed for use with media having regular circular or spiral tracks, but there has been a recent movement toward media on which the tracks are formed in wobbling guide grooves. For example, standards for compact disc (CD) media have been proposed in which absolute address information and information for constant linear velocity control are encoded in the wobble.

A general problem arising with such media is that if the tracking error detection system detects the wobble, the tracking servo may attempt to track the wobble, thereby defeating the purpose of the wobble. In the push-pull method, for example, if the servo system tracks the wobble accurately, the information encoded in the wobble is lost. A similar problem occurs in the differential push-pull method when the spacing between the three spots is one-fourth the repeating period of the wobble.

A somewhat different problem can occur in the three-beam method. If the two satellite spots are separated by a distance equal to the repeating period of the wobble, the servo system tracks the wobble at the locations of the satellite spots, thereby doubling the amplitude of the wobble at the central read/write spot. In recording, this leads to poorly formed pits; in reproducing, it degrades the quality of the reproduced signal.

The wobble-tracking problem is related to the problem of tracking offset, which can be caused by tilting of the rotating medium or track-following movement of the objective lens. This problem occurs particularly when the push-pull method is used. Previous attempts to correct offset by means of sensors that detect media tilt and objective-lens movement have been unsatisfactory, in part because they increase the complexity and cost of the apparatus. Attempts to avoid the second type of offset by moving the optical system as a whole instead of just the objective lens also increase the cost of the apparatus, because a more powerful actuator is needed.

SUMMARY OF THE INVENTION

It is accordingly an object of the present invention to generate a tracking error signal with reduced wobble and offset components.

Another object of the invention is to reduce the cost of optical recording and reproducing apparatus.

According to one aspect of the invention, an optical recording and reproducing apparatus record or reproduce information on or from information recording media having guide grooves that wobble with a certain repeating period. The apparatus comprises a laser for emitting one or more laser beams and an optical system for focusing the beam or beams to form a center spot and two satellite spots on the information-recording medium. The center spot and satellite spots are aligned in a straight line at an angle to the guide grooves. The center spot is disposed midway between the satellite spots and is distant from each satellite spot by an odd multiple of substantially one-half the repeating period of the wobble. Tracking error is detected by the differential push-pull method.

According to another aspect of the invention, the center spot is distant from each satellite spot by an odd multiple of substantially one-fourth the repeating period of the wobble and tracking error is detected by the three-beam method.

According to still another aspect of the invention, the optical system forms a single spot on the information-recording medium, and a difference signal is generated by the push-pull method. A bandpass filter extracts the wobble component of this difference signal. The wobble component and the reproduced information signal are input to a synchronous detector that produces a correction signal. A correction circuit combines the correction signal with the difference signal to produce a tracking error signal.

DETAILED DESCRIPTION OF THE INVENTION

Novel optical recording and reproducing apparatus employing the differential push-pull method, the three-beam method, and the push-pull method of tracking error detection will be described with reference to the attached drawings. The drawings are illustrative and do not restrict the scope of the invention, which should be determined solely from the appended claims.

Figure 1:
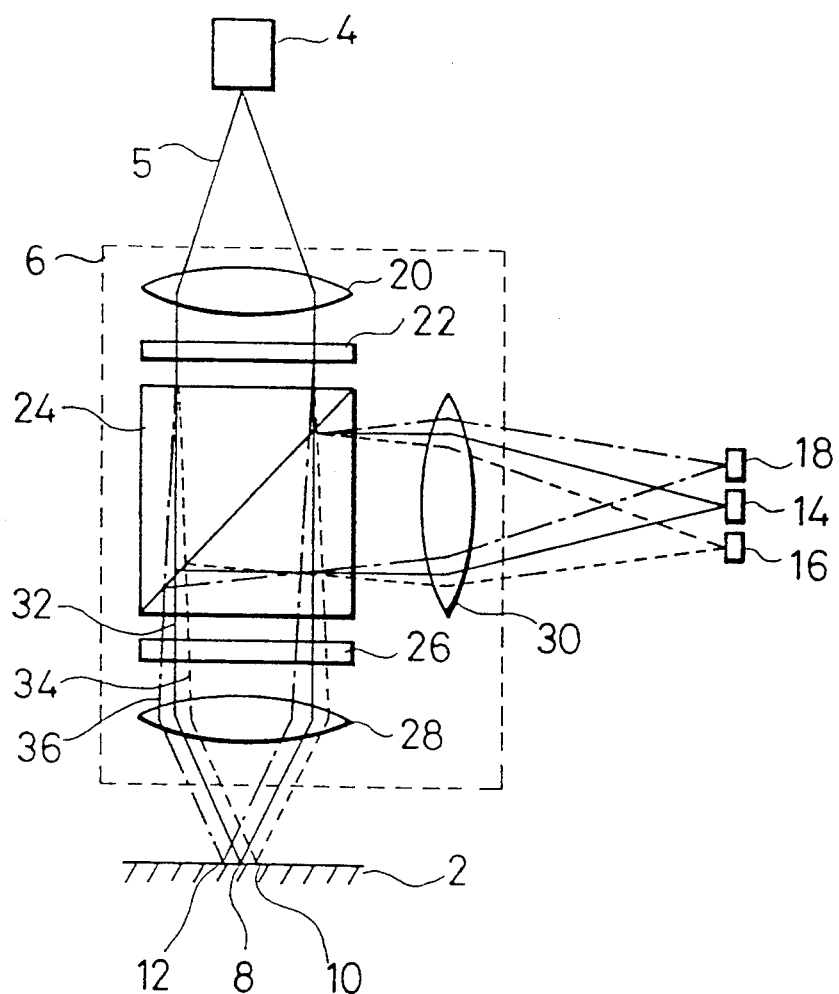
FIG. 1 is a sectional view of the optical system and related parts of a novel optical recording and reproducing apparatus employing the differential push-pull method.

Referring to FIG. 1, a first novel optical recording and reproducing apparatus comprises a disc-shaped information recording medium 2 that rotates in a plane at right angles to the page, and a semiconductor laser 4 that emits a laser beam 5. An optical system 6 diffracts and focuses the laser beam 5 to form a center spot 8 and two satellite spots 10 and 12 on the information recording medium 2. Three split photodetectors 14, 16, and 18 receive light reflected from the information recording medium 2 and convert the light to electrical signals that are input to a tracking error detection circuit to be shown later.

The optical system 6 comprises a collimator lens 20, a diffraction grating 22, a polarizing beam splitter 24, a quarter-wave plate 26, an objective lens 28, and a convergent lens 30. The collimator lens 20 converts the divergent laser beam 5 emitted by the laser 4 to a parallel beam. The diffraction grating 22 separates this parallel beam into three beams: a zeroth-order diffracted beam 32, and two first-order diffracted beams 34 and 36. These three beams pass through the polarizing beam splitter 24 and the quarter-wave plate 26 and are focused by the objective lens 28 onto the information recording medium 2, the zeroth-order diffracted beam 32 forming the center spot 8 and the first-order diffracted beams 34 and 36 forming the two satellite spots 10 and 12.

After reflection from the information recording medium 2, the three beams 32, 34, and 36 re-enter the optical system 6, pass through the objective lens 28 and the quarter-wave plate 26, are reflected in the polarizing beam splitter 24, and are directed by the convergent lens 30 onto the three split photodetectors 14, 16, and 18. The zeroth-order diffracted beam 32 is received by the first split photodetector 14, while the two first-order diffracted beams 34 and 36 are received by the second and third split photodetectors 16 and 18.

Figure 2:
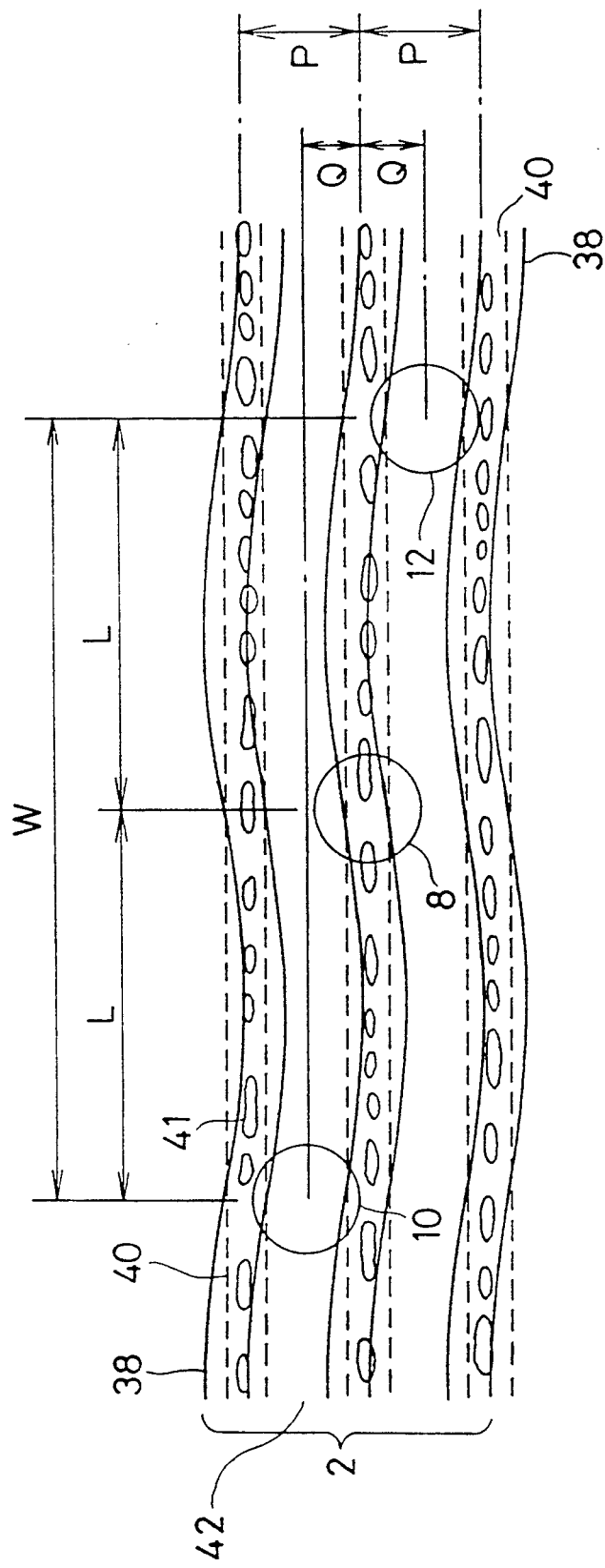
FIG. 2 is a plan view of the information recording medium in FIG. 1, showing the positions of the spots.

FIG. 2 is a plan view showing part of the information recording medium 2. When the information recording medium 2 is manufactured, it is preformatted with guide grooves 38 that wobble with a substantially constant repeating period W around center lines 40. The wobbling is substantially in phase between adjacent grooves. The center lines 40 are drawn as double lines representing where the edges of the guide grooves 38 would be if the guide grooves did not wobble. The wobble is greatly exaggerated for clarity in the drawings; the actual amplitude of the wobble is nominally one twenty-fifth of the spacing P of the guide grooves 38. This spacing P will be referred to below as the track pitch.

Information is recorded in the guide grooves 38 in the form of pits 41. The areas between the guide grooves 38 are referred to as land areas 42. As shown in the diagram, the spatial frequency of the pits 41 is much higher than the spatial frequency of the wobble. The pits 41 need not follow the wobble of the guide grooves 38; normally they follow the center lines 40 as shown in the drawing. Due to the exaggerated wobble in the drawings, some pits are shown as departing from the guide grooves, but in practice, such departure would be either nonexistent or extremely slight.

The center spot 8 and the two satellite spots 10 and 12 are aligned in a straight line at an angle to the guide grooves 38 (more precisely, at an angle to their center lines 40). The center spot 8 is disposed midway between the two satellite spots 10 and 12, at a distance L from each satellite spot in the horizontal direction in the drawing, i.e., the longitudinal direction of the guide grooves. L is equal to an odd multiple of half the repeating period W. In the drawing L is equal to one-half W, but the invention can be practiced with other odd multiples such as three-halves W, five-halves W, and so on.

L is the distance between the spots in the direction of the guide grooves 38 (the horizontal direction in the drawing). The two satellite spots 10 and 12 are also displaced from the center spot 8 in the vertical direction in the drawing, i.e., in the lateral direction of the guide grooves, by a distance Q equal to one-half the track pitch P. Q is much smaller than L, so the true distance of the center spot 8 from the satellite spots 10 and 12 is substantially equal to L.

Figure 3:
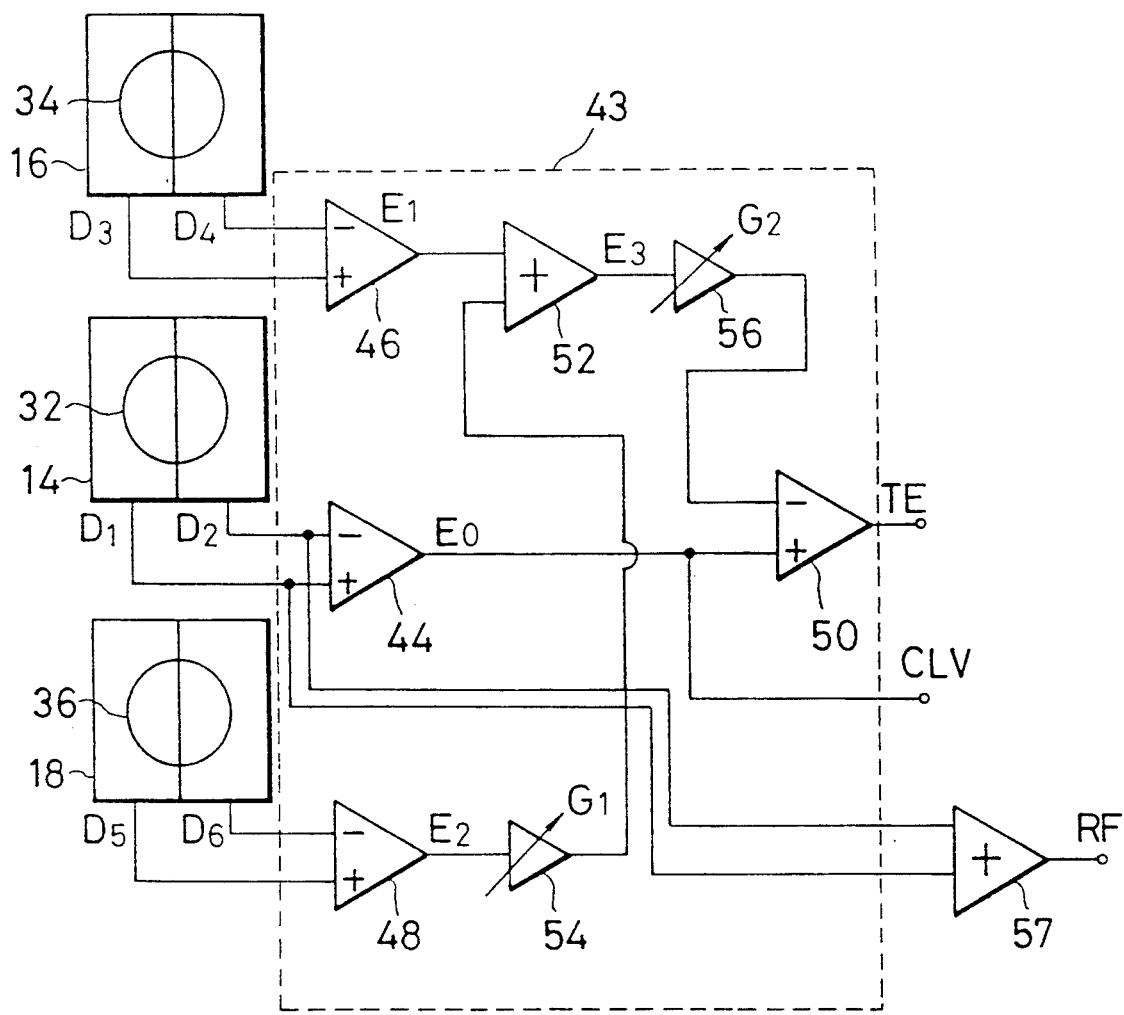
FIG. 3 is a schematic diagram of the tracking error detection circuit of the apparatus in FIG. 1.

FIG. 3 is a schematic diagram illustrating the three photodetectors 14, 16, and 18 and the tracking error detection circuit 43 to which they are connected. As shown, each split photodetector comprises two separate light-receiving surfaces that generate two separate electrical signals.

The tracking error detection circuit 43 comprises four differential amplifiers 44, 46, 48, and 50, a summing amplifier 52, and two variable-gain amplifiers 54 and 56. The differential amplifier 44 receives the two electrical signals $D_1$ and $D_2$ output by the first split photodetector 14 and generates a first difference signal $E_0$. The differential amplifier 46 receives the two electrical signals $D_3$ and $D_4$ output by the second split photodetector 16 and generates a second difference signal $E_1$. The differential amplifier 48 receives the two electrical signals $D_5$ and $D_6$ output by the third split photodetector 18 and generates a third difference signal $E_2$, which is amplified by the variable-gain amplifier 54. The summing amplifier 52 adds the amplified third difference signal $E_2$ to the second difference signal $E_1$. The variable-gain amplifier 56 amplifies the resulting sum $E_3$. The differential amplifier 50 subtracts the amplified sum $E_3$ from the first difference signal $E_0$ to generate a tracking error signal TE.

The tracking error signal TE is supplied to a tracking servo system, not shown in the drawings, that positions the three spots 8, 10, and 12 by moving the objective lens 28 in FIG. 1, or by moving the entire optical system 6 together with the laser 4 and the split photodetectors 14, 16, and 18. The tracking servo system is adapted to adjust the positions of the spots 8, 10, and 12 so as to reduce the value of the tracking error signal TE to zero.

The tracking error detection circuit 43 also supplies a constant linear velocity control signal CLV to a spindle servo system, not shown in the drawings, that controls the rotation of the information recording medium 2. The first difference signal $E_0$ can be used as this constant linear velocity control signal CLV, as shown in the drawing.

Another summing amplifier 57 receives the two electrical signals $D_1$ and $D_2$ output from the first split photodetector 32 and generates their sum as a reproduced information signal RF. This signal RF is supplied to signal-processing circuits, not shown in the drawings, that reproduce the information encoded in the pits 41.

Next the difference signals $E_0$, $E_1$, and $E_2$ will be described in more detail.

The three difference signals $E_0$, $E_1$, and $E_2$ have four components: a high-frequency information component due to the pits 41; a lower-frequency wobble component due to the wobble of guide grooves 38; a still lower-frequency tracking error component due to displacement of the center spot 8 from the center line 40 of the guide groove 38 being followed; and an offset component generated by such factors as tilt of the information recording medium 2 and movement of the objective lens 28.

Figure 4:
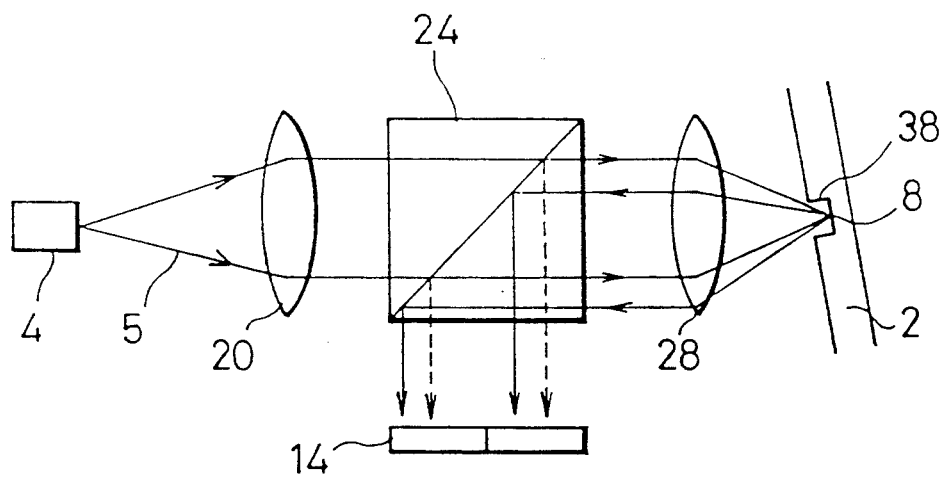
FIG. 4 is a simplified sectional view of the optical system, illustrating offset caused by tilt of the information recording medium.

FIG. 4 illustrates how tilt of the information recording medium 2 can generate offset. For clarity, the diffraction grating 22 and the quarter-wave plate 26 are omitted and only the zeroth-order diffracted beam 32 is shown. The center spot 8 is exactly centered in a guide groove 38. If the information recording medium 2 were not tilted, reflected light from the center spot 8 would follow the dashed arrows and illuminate the two halves of the photodetector 14 equally. Because of the tilt, however, the reflected light follows the solid lines and illuminates the two halves of the photodetector 14 unequally, causing a dc offset in the difference signal.

Figure 5:
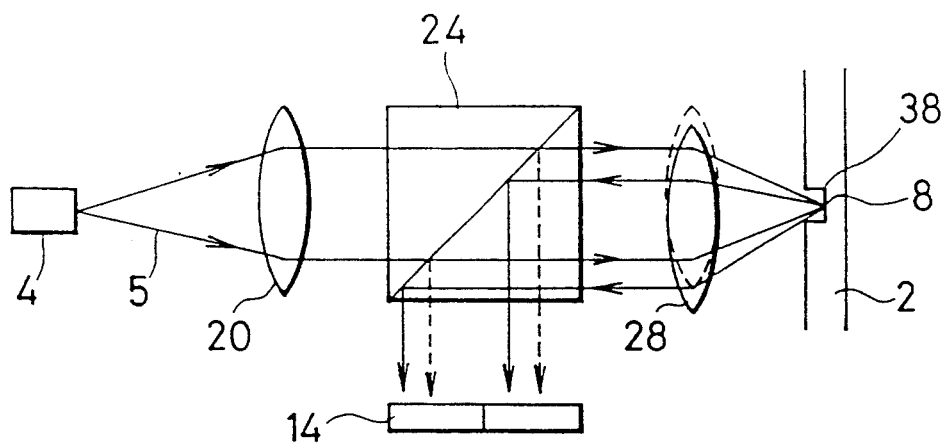
FIG. 5 is another simplified sectional view of the optical system, illustrating offset caused by movement of the objective lens.

FIG. 5 illustrates how displacement of the objective lens 28 can generate offset. This problem occurs when track following is performed by moving the objective lens 28 without moving the photodetectors. If the objective lens 28 is centered over the guide groove 38 being tracked, as indicated by dashed lines, reflected light follows the dashed arrows and illuminates the two halves of the photodetector 14 equally. If the objective lens 28 has been moved downward in the drawing, however, as indicated by solid lines, reflected light illuminates the two halves of the photodetector 14 unequally. The resulting offset in the difference signal changes with movement of the objective lens 28, but the change becomes appreciable only after the objective lens 28 has moved much farther than the track pitch P. Over reasonable periods of time, such as during the following of a single track in FIG. 2, this offset can also be treated as a dc component of the difference signal.

Next the use of the constant linear velocity control signal CLV will be described.

The spindle servo system has a bandpass filter that rejects the dc offset component, the low-frequency tracking error component, and the high-frequency information component of the constant linear velocity control signal CLV. The spindle servo thus responds only to the wobble component. The spindle servo is adapted to control the rotation of the information recording medium 2 so that the wobble component has a constant center frequency of, for example, 22.05 kilohertz as in the proposed compact-disc standard.

Although the repeating period W of the wobble is substantially constant, it is not exactly constant; it is modulated slightly to encode absolute address information. This modulation is detected as a frequency modulation of the constant linear velocity control signal CLV with a maximum deviation of ±1 kilohertz. Thus during normal operation the wobble has a frequency of 22.05±1 kilohertz.

Next the tracking error signal TE will be described. The tracking servo system has a low-pass filter that rejects the high-frequency information component of the tracking error signal TE, so the high-frequency information components of the difference signals $E_0$, $E_1$, and $E_2$ will be ignored in this description.

Figure 6:
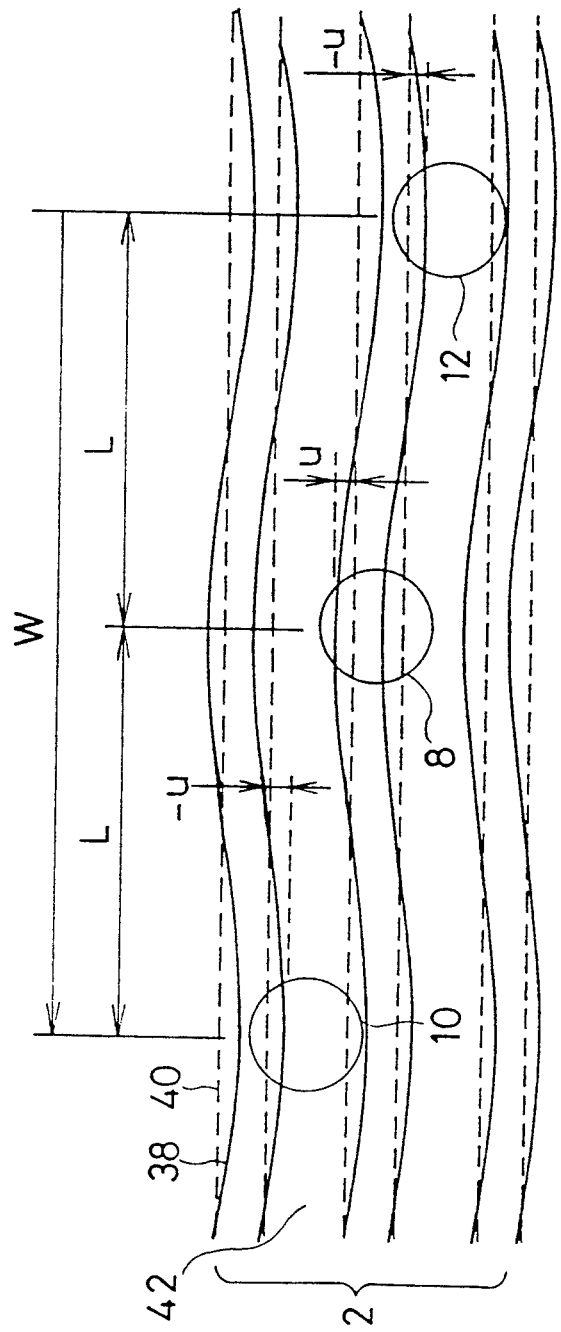
FIG. 6 is another plan view of the information recording medium.

Taken together, the tracking error and wobble components can be approximated by a sine function of the deviation of the spot from the guide groove. Referring to FIG. 6 (in which the pits 41 are omitted for clarity), let U be the deviation of the guide grooves 38 from the center line 40 at the location of the center spot 8. Since the satellite spots 10 and 12 are separated from the center spot 8 by a distance L equal to half the repeating period W of the wobble, at the satellite spots 10 and 12 the guide grooves 38 deviate by an equal amount -U in the opposite direction. Let X be the tracking error, i.e. the deviation of the center spot 8 from the center line 40 (in the drawings X is zero). Then the three difference signals can be represented as follows:

$$E_0 = A_0 \sin [2\pi(X-U)/P] + B_0$$

$$E_1 = A_1 \sin [2\pi(X+Q+U)/P] + B_1$$

$$E_2 = A_2 \sin [2\pi(X+Q-U)/P] + B_2$$

The constants $A_0$, $A_1$, and $A_2$ are the amplitudes of the tracking error plus wobble components of the three difference signals and $B_0$, $B_1$, and $B_2$ are their offset components. Since $Q = P/2$ and hence $2\pi Q/P = \pi$, the formulas for $E_1$ and $E_2$ can be simplified as follows.

$$E_1 = -A_1 \sin [2\pi(X+U)/P] + B_1$$

$$E_2 = -A_2 \sin [2\pi(X-U)/P] + B_2$$

From FIGS. 4 and 5 it can be understood that offset affects all three difference signals in the same way; that is, the amplitudes and offsets are related as follows:

$$A_0/B_0 = A_1/B_1 = A_2/B_2$$

The gain $G_1$ of the variable-gain amplifier 54 is set to $A_1/A_2$. The signal $E_3$ can therefore be expressed as follows:

$$E_3 = E_1 + G_1 E_2 = -2A_1 \sin [2\pi(X+U)/P] + 2B_1$$

The gain $G_2$ of the variable-gain amplifier 56 is set to $A_0/(2A_1)$. The tracking error signal TE is therefore:

$$TE = E_0 - G_2 E_3$$

-continued
$$= A_0\sin[2\pi (X - U)/P] + A_0\sin[2\pi (X + U)/P]$$
$$= 2A_0\sin(2\pi X/P)\cos(2\pi U/P)$$

Since the wobble U is much smaller than the track pitch P, $\cos(2\pi U/P)$ is substantially equal to unity. To a close approximation, TE is therefore expressible as follows:

$$TE = 2A_0 \sin (2\pi X/P)$$

As a sine function of X, this tracking error signal TE accurately represents the tracking error, without offset or wobble. The tracking servo therefore tracks the center line 40 accurately, resulting in a high-quality constant linear velocity control signal CLV, a high-quality reproduced information signal RF during reproduction, and well-formed pits during recording.

In the case of a compact disc with a constant linear velocity between 1.2 and 1.4 meters per second in which the wobble frequency is 22.05±1 kilohertz, to be equal to half the repeating period of the wobble, the separation L between the center spot 8 and the satellite spots 10 and 12 should be 24 to 35 microns. The invention is not restricted to this particular range of values however, odd multiples of half the repeating period of the wobble also being usable.

Figure 7:
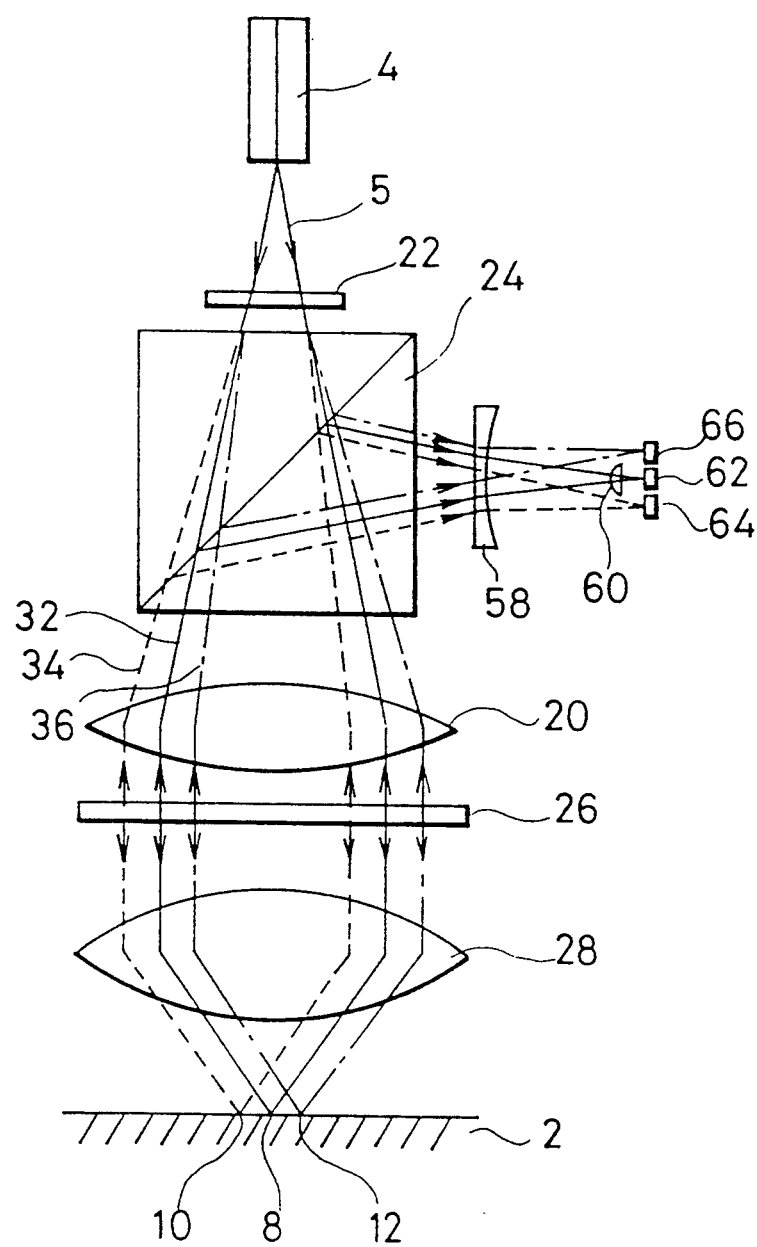
FIG. 7 is a sectional view of the optical system and related parts of a novel optical recording and reproducing apparatus employing the three-beam method.

FIG. 7 shows a second novel optical recording and reproducing apparatus that uses the three-beam method. The optical system is the same as before except that the collimator lens 20 is disposed below the polarizing beam splitter 24, a divergent lens 58 is used instead of the convergent lens 30 in FIG. 1, and an additional cylindrical lens 60 is provided. The zeroth-order diffracted beam 32 reflected from the center spot 8 is received by a quadrant photodetector 62, which provides signals for information reproduction and focus control. The two first-order diffracted beams 34 and 36 reflected from the satellite spots 10 and 12 are received by a first photodetector 64 and a second photodetector 66.

Figure 8:
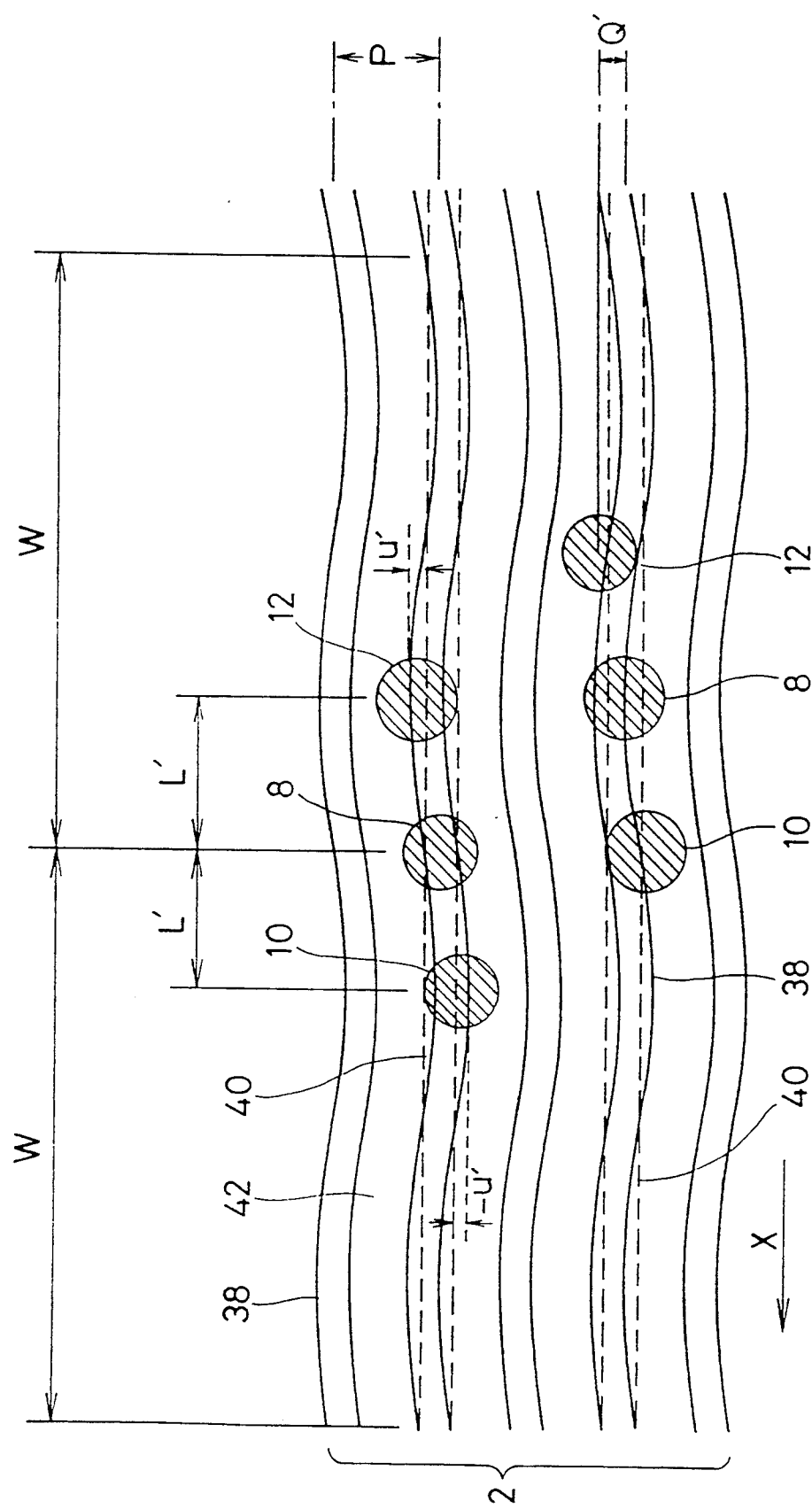
FIG. 8 is a plan view of the information recording medium in FIG. 7, showing the positions of the spots.

FIG. 8 is a plan view of part of the information recording medium 2, showing the three spots in two positions: one (in the upper part of the drawing) in which the center spot 8 is disposed at a point of minimum wobble, and another (in the lower part of the drawing) in which the center spot 8 is disposed at a point of maximum wobble. Of course the three spots 8, 10, and 12 are in only one position at a time. The lower position results from the upper after a rotation of the information recording medium 2 in the direction of the arrow X.

The distance of the two satellite spots 10 and 12 from the center spot 8 is exactly half what it was in FIG. 2. The displacement Q' in the vertical direction is one-fourth the track pitch P. The separation L' in the horizontal direction in the drawing is one-fourth the repeating period W of the wobble. In the case of media rotating with a constant linear velocity of 1.2 to 1.4 meters per second and a wobble frequency of 22.05±1 kilohertz, the separation L' should be 11 to 18 microns.

Figure 9:
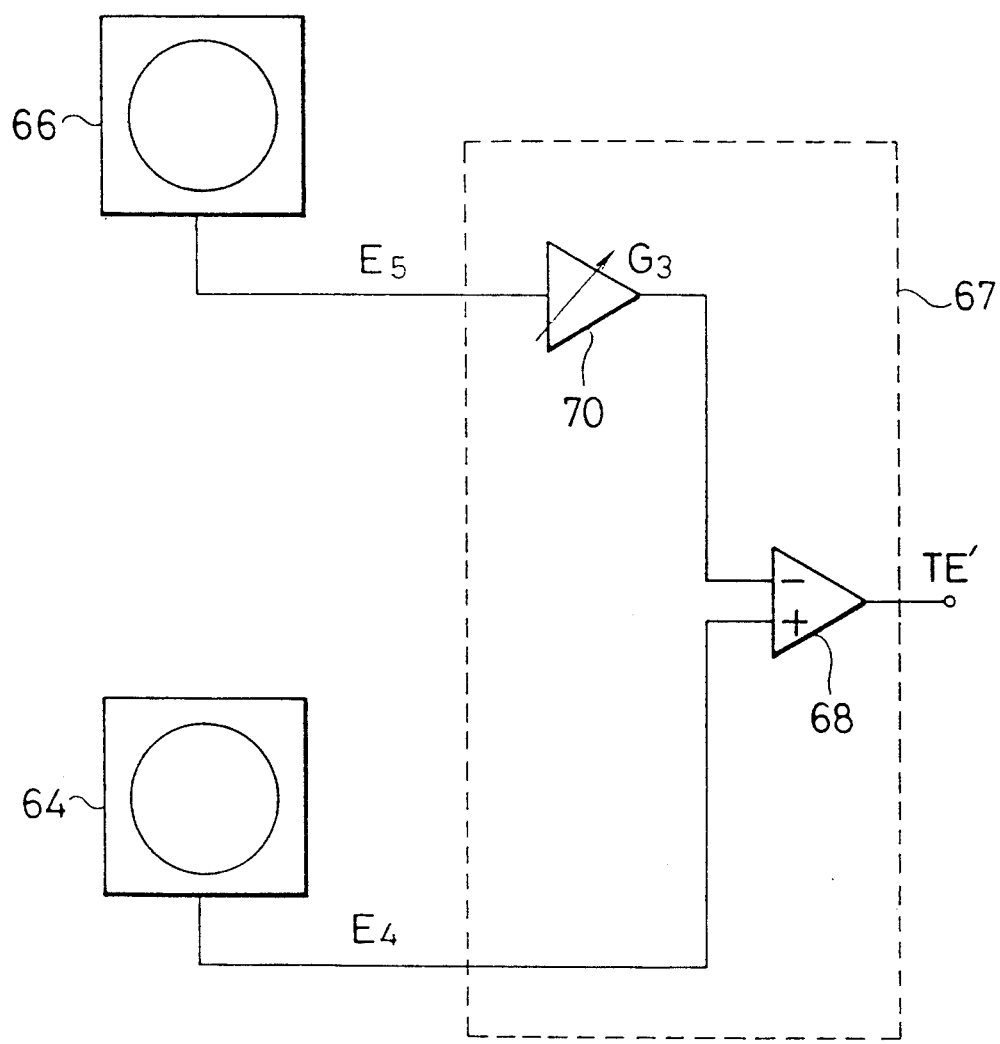
FIG. 9 is a schematic diagram of the tracking error detection circuit of the apparatus in FIG. 7.

FIG. 9 shows the tracking error detection circuit 67 to which the first and second photodetectors 64 and 66 are connected. The first photodetector 64 produces a first electrical signal $E_4$ that is fed to the non-inverting input of a differential amplifier 68. The second photodetector 66 produces a second electrical signal $E_4$ that is amplified by a variable-gain amplifier 70 and fed to the inverting input of the differential amplifier 68. The output of the differential amplifier 68 is a tracking error signal TE'.

To avoid obscuring the invention with unnecessary detail, the electronics for processing signals from the quadrant photodetector 62 and generating the reproduced information signal and constant linear velocity control signal are omitted.

The first and second electrical signals $E_4$ and $E_5$ can be approximated by cosine functions, with amplitudes $A_4$ and $A_5$, of the displacement of the spot from the guide groove, plus offset components $B_4$ and $B_5$. Since the satellite spots 10 and 12 are mutually separated by half the repeating period of the wobble, the wobble U' at the satellite spot 12 is equal and opposite to the wobble $-U'$ at the satellite spot 10.

$$E_4 = A_4 \cos [2\pi(X - Q' + U')/P] + B_4$$

$$E_5 = A_5 \cos [2\pi(X + Q' - U')/P] + B_5$$

The gain $G_3$ of the variable-gain amplifier 70 is set to the amplitude ratio $A_4/A_5$, which equals the offset ratio $B_4/B_5$. The tracking error signal TE' is accordingly:

$$\begin{aligned}TE' &= E_4 - G_3 E_5 \\ &= A_4\cos[2\pi (X - Q' + U')/P] - A_4\cos[2\pi (X + Q' - U')/P] \\ &= 2A_4\sin(2\pi X/P)\sin[2\pi (Q' - U')/P]\end{aligned}$$

Q' is P/4 and U' is much smaller than P, so $2\pi(Q'-U')/P$ is close to $\pi/2$ and $\sin[2\pi(Q'-U')/P]$ is substantially equal to unity. Therefore, to a close approximation:

$$TE' = 2A_4 \sin (2\pi X/P)$$

This tracking error signal TE' is free of offset and substantially free of wobble, resulting in the same benefits as in the first novel apparatus: accurate tracking of the center line 40, a high-quality constant linear velocity control signal, a high-quality reproduced information signal during reproduction, and well-formed pits during recording.

It is not necessary for the spacing between the spots to be one-fourth the repeating period W of the wobble as in FIG. 8. A spacing of three-fourths W (33 to 54 microns for media rotating with a constant linear velocity of 1.2 to 1.4 meters per second and a wobble frequency of 22.05±1 kilohertz) gives the same effect, as do other odd multiples of one-fourth W.

The apparatus in FIGS. 1 and 7 uses a diffraction grating to produce three laser beams, but the invention is not restricted to this means of beam production. Instead of a diffraction grating, it is possible to employ a monolithic semiconductor laser array that emits three laser beams from a single lasting region, or a hybrid semiconductor laser array having three lasing regions, each of which emits a single laser beam.

Figure 10:
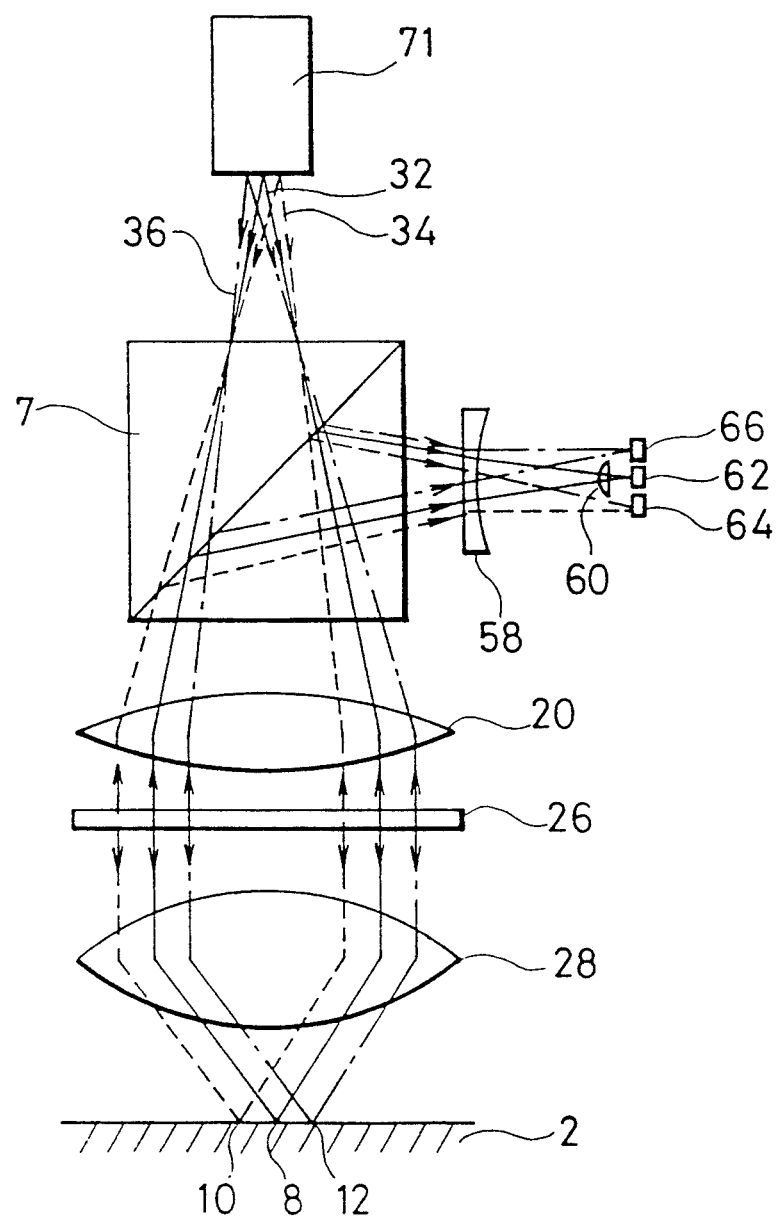
FIG. 10 is a sectional view of the optical system and related parts of another novel optical recording and reproducing apparatus employing the three-beam method.

FIG. 10 shows an apparatus that employs a laser array 71 of this type to emit three laser beams 32, 34, and 36. Other components are the same as in FIG. 7, so a description will be omitted. If the beams are disposed so that the interval between the three spots 8, 10, and 12 is an odd multiple of one-fourth the repeating period of the wobble, the same effect is obtained as in FIG. 7. In addition, the cost of the apparatus is reduced because no diffraction grating is needed in the optical system.

A similar type of laser array 71 can be used when the differential push-pull method is employed. In this case the beams should of course be disposed so that the intervals between the spots are an odd multiple of one-half the repeating period of the wobble.

Figure 11:
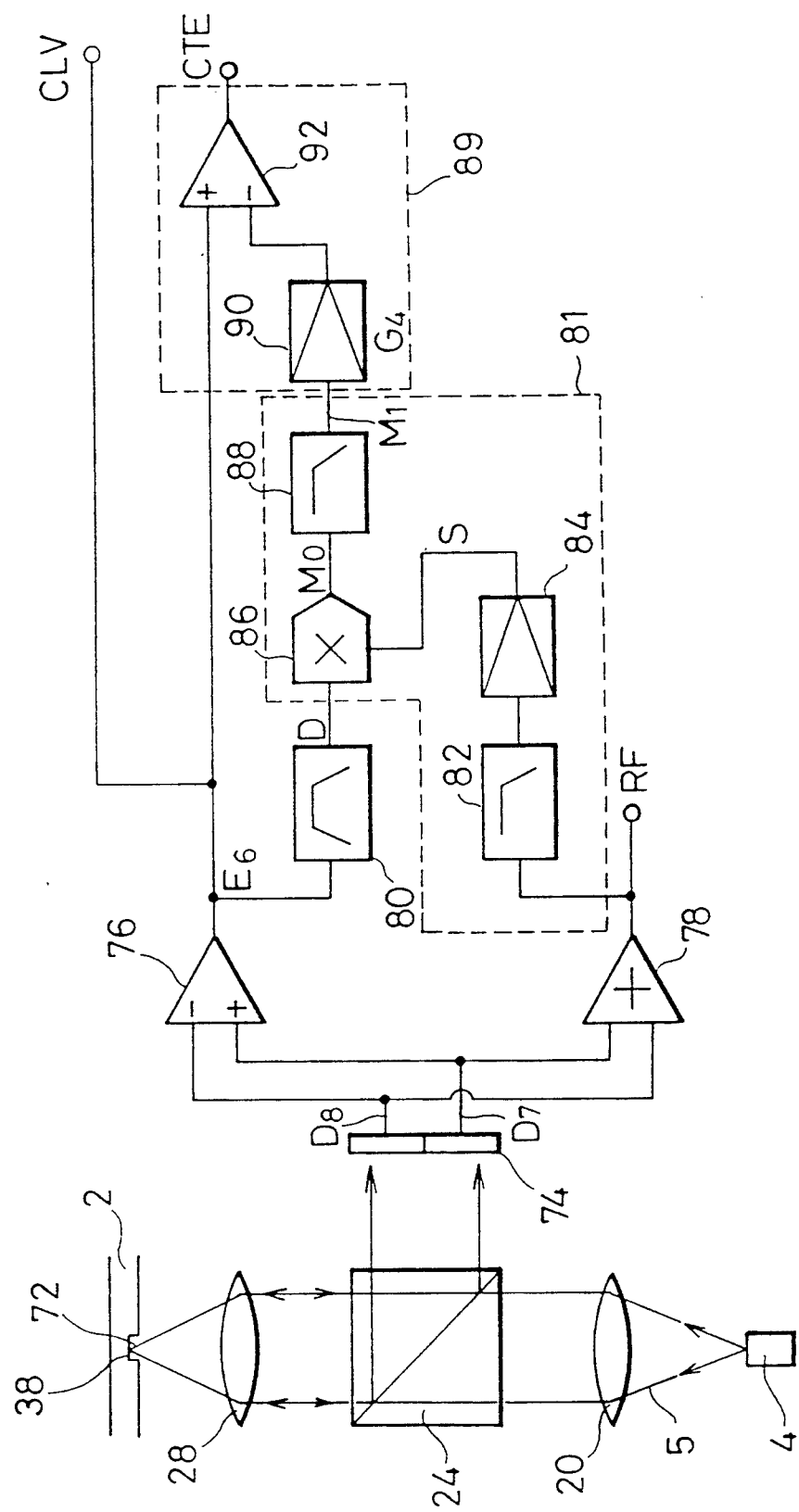
FIG. 11 is a sectional view of the optical system and a schematic diagram of the tracking error detection circuit of a novel optical recording and reproducing apparatus employing the push-pull method.

FIG. 11 shows a novel optical recording and reproducing apparatus that uses the push-pull method. As before, the information recording medium 2 has a wobbling guide grooves 38 and is controlled to rotate with a constant linear velocity at which the wobble frequency is, for example, 22.05±1 kilohertz.

This method employs only a single laser beam 5 and spot 72, so the optical system requires no diffraction grating or other means of producing multiple beams and spots. FIG. 11 illustrates a simplified representation of the optical system, showing only the collimator lens 20, the polarizing beam splitter 24, and the objective lens 28.

The push-pull method employs a single split photodetector 74 that receives reflected light from the spot 72 and generates a pair of electrical signals $D_7$ and $D_8$. These electrical signals $D_7$ and $D_8$ are fed to a differential amplifier 76 and a summing amplifier 78. The summing amplifier 78 generates a sum signal that can be used as the reproduced information signal RF. The differential amplifier 76 generates a difference signal $E_6$ that can be used as the constant linear velocity control signal CLV.

The difference signal $E_6$ is fed to a bandpass filter 80 with cutoff frequencies of, for example, 20 and 30 kilohertz that extracts the wobble component D of the difference signal $E_6$. This wobble component D and the sum signal from the summing amplifier 78 are fed to a synchronous detector 81 comprising a low-pass filter 82, an amplifier 84, a multiplier 86, and another low-pass filter 88.

The low-pass filter 82 receives the sum signal RF and rejects its high-frequency information component. The cutoff frequency of the low-pass filter 82 is, for example, 30 kilohertz. The amplifier 84 amplifies the output of the low-pass filter 82 and sends the filtered, amplified sum signal S to the multiplier 86. The multiplier 86 also receives the wobble component D of the difference signal $E_6$ from the bandpass filter 80. The multiplier 86 multiplies D by S and sends their product $M_0$ to the low-pass filter 88.

The low-pass filter 88 has a cutoff frequency less than the wobble frequency. If the wobble frequency is 22.05±1 kilohertz, the cutoff frequency of the low-pass filter 88 is, for example, less than 20 kilohertz. The output from the low-pass filter 88 is a correction signal $M_1$ that is combined with the difference signal $E_6$ in a correction circuit 89 to generate a corrected tracking error signal CTE.

The correction circuit 89 comprises an amplifier 90 that amplifies the correction signal $M_1$, and a differential amplifier 92 that subtracts the amplified correction signal received from the amplifier 76 from the difference signal $E_6$ to generate the corrected tracking error signal CTE.

Figure 12:
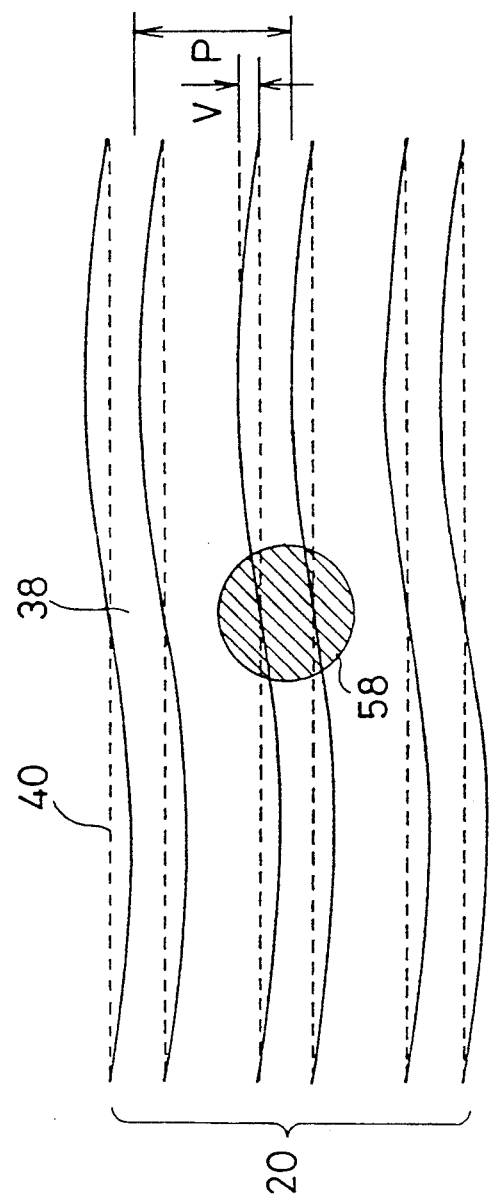
FIG. 12 is a plan view of the information recording medium in FIG. 11.

FIG. 12 is a plan view of part of the information recording medium 2, showing the spot 72 disposed on the center line 40 of a guide groove 38 so that the tracking error X is zero. As before P is the track pitch. The letter V represents the maximum amplitude of the wobble, which is exaggerated in the drawing but is substantially one twenty-fifth of the track pitch P.

Tracking error detection by this optical recording and reproducing apparatus can be described mathematically as follows.

The difference signal $E_6$ output from the differential amplifier 76 has the same form as the signal $E_0$ discussed earlier:

$$E_6 = A \sin[2\pi(X-U)/P] + B$$

where A is the amplitude of the tracking error component, B is an offset component, U is a wobble, and X is the tracking error. The wobble U can be expressed as follows:

$$U = V \sin(2\pi f t)$$

where f is the frequency of the wobble (22.05±1 kilohertz, for example) and t represents time.

The bandpass filter 80 rejects frequency components other than the wobble-frequency component. Furthermore, U is much smaller than P, so $\sin(2\pi U/P)$ is substantially equal to U/P. The signal D output by the bandpass filter 80 therefore has the form:

$$\begin{aligned}D &= A\sin(-2\pi U/P)\\ &= -2\pi AU/P\\ &= -2\pi AV/P \cdot \sin(2\pi f t)\end{aligned}$$

The low-pass filter 82 eliminates the high-frequency information component of the reproduced information signal RF, so the signal S output by the amplifier 84 has the form:

$$S = A' \cos[2\pi(X-U)/P] + B'$$

where A' is the amplitude of the tracking error component and B' is an offset component. The product $M_0$ of D and S can be calculated as follows:

$$\begin{aligned}M_0 &= D \cdot S\\ &= D\{B' + A'\cos[2\pi(X-U)/P]\}\\ &= D[B' + A'\cos(2\pi X/P)\cos(2\pi U/P) +\\ &\quad A'\sin(2\pi X/P)\sin(2\pi U/P)]\\ &= D[B' + A'\cos(2\pi X/P) + A'(2\pi U/P)\sin(2\pi X/P)]\\ &= DB' + DA'\cos(2\pi X/P) -\\ &\quad (2\pi AV/P)(2\pi V/P)A'\sin(2\pi f t)\sin(2\pi f t)\sin(2\pi X/P)\\ &= DB' + DA'\cos(2\pi X/P) -\\ &\quad (2\pi V/P)(2\pi V/P)AA'\sin(2\pi X/P)[1 - \cos(4\pi f t)]/2\end{aligned}$$

since the cutoff frequency of the low-pass filter 22 is less than the wobble frequency f, low-pass filtering of $M_0$ eliminates DB' and DA' $\cos(2\pi X/P)$ and produces the following correction signal $M_1$:

$$M_1 = K \sin(2\pi X/P)$$

where $$K = -(2\pi V/P)(2\pi V/P)AA'/2$$

K is a constant, so the correction signal $M_1$ is expressed as a sine function of the tracking error X. The correction signal $M_1$ itself could therefore be used as a tracking error signal, but it would not be very accurate because of the small value of the constant K.

However, when $E_6$ is equal to zero, the correction signal $M_1$ gives an approximate indication of the size of the offset component B. If the gain $G_4$ of the amplifier 76 is adjusted so that $G_4 M_1 = B$ in this case, the unwanted offset component can be removed from the corrected tracking error signal CTE generated by the differential amplifier 78 when $E_6$ is zero, thereby causing the tracking servo to move the spot 72 closer to the center line 40. The correction signal $M_1$ is further more wobble-free, so combining $M_1$ and $E_6$ in this way reduces the relative magnitude of the unwanted wobble component in CTE. Use of the corrected tracking error signal CTE thus improves both the accuracy and reliability of track following operations.

While the corrected tracking error signal CTE in FIG. 11 is not necessarily as accurate as the tracking error signals TE and TE' generated by the novel apparatus in FIGS. 1 to 10, the apparatus in FIG. 11 has the advantage of lower cost due to a simpler optical system. Moreover, all of the apparatus shown in FIGS. 1 to 12 has the advantage that by eliminating or reducing the offset component of the tracking error signal, it eliminates or reduces the need for sensors to detect tilt of the information recording medium 2 or movement of the objective lens 28, and increases the range over which track following can be carried out by moving the objective lens 28 without moving the entire optical system.

Figure 13:
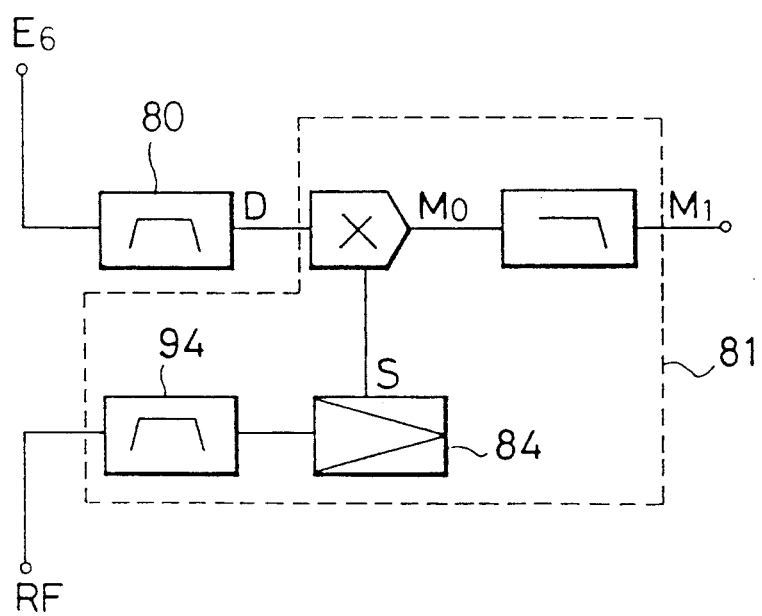
FIG. 13 is a schematic diagram illustrating a variation of the synchronous detector in FIG. 11.

The synchronous detector 81 and correction circuit 89 are not restricted to the configurations shown in FIG. 11. For example, the low-pass filter 82 in FIG. 11 can be replaced by a bandpass filter 94 identical to the bandpass filter 80, as shown in FIG. 13. The preceding analysis of the signal S is unchanged by this replacement.

Other modifications that will be obvious to those skilled in the art can be made in the apparatus shown in FIGS. 1, 3, 7, 9, 10, and 11 without departing from the spirit and scope of the present invention as set forth in the following claims.

What is claimed is:

1. An optical apparatus for recording or reproducing information on or from an information recording medium having grooves that are disposed at a certain pitch and that wobble with a certain repeating period, said apparatus comprising:
    a laser for emitting at least one laser beam;
    an optical system for receiving said laser beam and forming a center spot and two satellite spots on said information recording medium, said center spot and said two satellite spots being aligned in a straight line at an angle to said grooves with said center spot midway between said two satellite spots, said center spot being distant from each of said two satellite spots by an odd multiple of substantially one-fourth said repeating period in a longitudinal direction of said grooves;
    a first photodetector for receiving reflected light from one of said two satellite spots and generating a first electrical signal;
    a second photodetector for receiving reflected light from another of said two satellite spots and generating a second electrical signal; and
    a tracking error detection circuit for subtracting said second electrical signal from said first electrical signal to generate a tracking error signal.

2. The apparatus of claim 1 wherein said laser emits a single laser beam and said optical system has a diffraction grating for separating said single laser beam into three beams.

3. The apparatus of claim 1, wherein said laser is a monolithic semiconductor laser array that emits three laser beams from a single laser region.

4. The apparatus of claim 1, wherein said laser is a hybrid semiconductor laser array having three laser regions, each of which emits a single laser beam.

5. The apparatus of claim 1, wherein said information recording medium rotates with a constant linear velocity between 1.2 and 1.4 meters per second, and said grooves wobble at a frequency of $22.05 \pm 1$ kilohertz.

6. The apparatus of claim 5, wherein said center spot is separated from each of said satellite spots by a distance not less than 11 microns and not greater than 18 microns.

7. The apparatus of claim 5, wherein said center spot is separated from each of said satellite spots by a distance not less than 33 microns and not greater than 54 microns.

8. The apparatus of claim 1, wherein said center spot is distant from each of said two satellite spots by substantially one-fourth said pitch of said grooves in a lateral direction of the grooves.

9. A method for recording or reproducing information on or from an information recording medium having grooves that wobble with a repeating period within a first distance, the method comprising:
    (a) supplying three beams on said information recording medium at an information position, a first adjacent position and a second adjacent position, said first and second adjacent positions being located an odd multiple of substantially one fourth of said first distance in a longitudinal direction of said grooves plus a deviation in a direction perpendicular to the longitudinal direction of said grooves from said information position;
    (b) generating a first signal from the reflected light from said first adjacent position;
    (c) generating a second signal from the reflected light from said second adjacent position;
    (d) determining an error signal as a function of said first and second signals;
    (e) controlling the location of said information position based upon said error signal.

10. The method of claim 9 wherein step (a) includes splitting a laser beam using a diffraction grating.

11. The method of claim 9 wherein step (a) includes emitting three laser beams from a monolithic semiconductor.

12. The method of claim 9 wherein step (a) includes emitting three lasers from a hybrid semiconductor laser array having three laser regions.

13. The method of claim 9 further including the step of
    (f) rotating said information recording medium with a constant linear velocity between 1.2 and 1.4 meters per second having said grooves wobble at a frequency of 22.05 plus or minus 1 kilohertz.

14. The method of claim 9 wherein step (a) includes linearly aligning said information position and said first and second adjacent positions.

15. The method of claim 14 wherein step (b) includes supplying the three beams such that said information position is separate from said first and second adjacent positions by 11 to 18 microns.

16. The method of claim 14 wherein step (b) includes supplying the three beams such that said information position is separate from said first and second adjacent positions by 33 to 54 microns.

17. The method of claim 9 wherein said deviation is equal to one fourth the distance between adjacent grooves.

18. An apparatus for recording or reproducing information on or from a recording medium having grooves that wobble with a repeating period within a first distance, the apparatus comprising:

optical means for impinging three beams on said information recording medium at an information position, a first adjacent position and a second adjacent position, said first and second adjacent positions being located an odd multiple of substantially one fourth said first distance in a longitudinal direction of said grooves plus a displacement in a direction perpendicular to the longitudinal direction of said grooves from said information position;

means for determining an error signal as a function of detected reflected light from said first and second adjacent positions; and means for controlling the location of said information position having said error signal as an input.

19. The apparatus of claim 18 wherein the optical means includes a diffraction grating.

20. The apparatus of claim 18 wherein the optical means includes a monolithic semiconductor which emits three laser beams.

21. The apparatus of claim 18 wherein the optical means includes a hybrid semiconductor laser array having three laser regions each of which emit a laser.

22. The apparatus of claim 18 wherein
   said optical mean linearly aligns said information position and said first and second adjacent positions, and
   said displacement is equal to one fourth the distance between adjacent grooves.

* * * * *